US009959767B1

(12) United States Patent
Canella et al.

(10) Patent No.: US 9,959,767 B1
(45) Date of Patent: May 1, 2018

(54) METHOD AND APPARATUS FOR WARNING OF OBJECTS

(71) Applicant: GM GLOBAL TECHNOLOGY OPERATIONS LLC, Detroit, MI (US)

(72) Inventors: David A. Canella, Pickering (CA); Norman J. Weigert, Whitby (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days. days.

(21) Appl. No.: 15/342,795

(22) Filed: Nov. 3, 2016

(51) Int. Cl.
*B60Q 1/00* (2006.01)
*G08G 1/16* (2006.01)
*G06T 11/00* (2006.01)
*G06F 3/14* (2006.01)

(52) U.S. Cl.
CPC .............. *G08G 1/166* (2013.01); *G06F 3/14* (2013.01); *G06T 11/001* (2013.01); *G06T 2207/30241* (2013.01); *G06T 2207/30261* (2013.01)

(58) Field of Classification Search
CPC ........ B60R 2300/202; B60R 2300/302; B60R 2300/802; G08G 1/166; G06T 11/001; G06F 3/14
USPC .................................. 340/435, 903; 701/400
See application file for complete search history.

(56) References Cited

U.S. PATENT DOCUMENTS

| | | | | |
|---|---|---|---|---|
| 7,804,421 | B2* | 9/2010 | Vitito | B60R 1/00 340/435 |
| 8,451,141 | B2* | 5/2013 | Uechi | G08G 1/096783 340/435 |
| 2004/0004541 | A1* | 1/2004 | Hong | B60R 1/00 340/435 |
| 2007/0081262 | A1* | 4/2007 | Oizumi | B60R 1/00 359/843 |
| 2009/0009314 | A1* | 1/2009 | Taniguchi | B60R 1/00 340/461 |
| 2010/0253596 | A1 | 10/2010 | Szczerba et al. | |
| 2011/0090073 | A1* | 4/2011 | Ozaki | B60R 1/00 340/435 |
| 2014/0266656 | A1* | 9/2014 | Ng-Thow-Hing | G08G 1/166 340/435 |
| 2015/0336511 | A1* | 11/2015 | Ukeda | B60R 1/00 348/148 |
| 2016/0144785 | A1* | 5/2016 | Shimizu | B60R 1/00 340/435 |
| 2017/0015248 | A1* | 1/2017 | Baur | B60R 1/00 |

* cited by examiner

Primary Examiner — Thomas Mullen

(57) ABSTRACT

A method and apparatus for warning of occluded or obstructed objects are provided. The method includes: detecting a presence of at least one object in a predetermined area, the predetermined area being visually obstructed from an operator of a machine; determining whether at least one condition for displaying the detected at least one object is met; and in response to determining that the at least one condition is met, displaying a graphical indicator corresponding to the detected at least one object. The method and apparatus may be implemented in a vehicle to display graphical indicators warning of object on obstructing portions of the vehicle.

14 Claims, 2 Drawing Sheets

METHOD AND APPARATUS FOR WARNING OF OBJECTS

INTRODUCTION

Apparatuses and methods consistent with exemplary embodiments relate to warning of objects. More particularly, apparatuses and methods consistent with exemplary embodiments relate to warning of objects that are visually obstructed by non-transparent components.

SUMMARY

One or more exemplary embodiments provide a method and an apparatus that detect objects or obstacles that are visually obstructed by non-transparent components of a vehicle. More particularly, one or more exemplary embodiments provide a method and an apparatus that detect objects that are visually obstructed by non-transparent components of a vehicle and warns a driver of the objects or obstacles.

According to an aspect of an exemplary embodiment, a method for warning of objects is provided. The method includes detecting a presence of at least one object in a predetermined area, the predetermined area being visually obstructed from an operator of a machine, determining whether at least one condition for displaying the detected at least one object is met; and in response to determining that the at least one condition is met, displaying a graphical indicator corresponding to the detected at least one object.

The detected at least one object may include a plurality of objects and the method further include: detecting depths of the plurality of objects. The displaying the graphical indicator may include displaying a plurality of graphical indicators with depth cues corresponding to the detected depths of the plurality of objects.

The method may further include detecting trajectories and locations of the plurality of objects. The displaying the graphical indicator may include displaying the plurality of graphical indicators with depth, location and trajectory cues including one or more from among a shading of a graphical indicator, a transparency of a graphical indicator, an outlining of a graphical indicator, a size of a graphical indicator, a size of a graphical indicator relative to other graphical indicators, a color of a graphical indicator, a shape of a graphical indicator, a location of a graphical indicator, a motion of a graphical indicator, an occlusion of a graphical indicator by another, and an image displayed with a graphical indicator.

The determining whether the at least one condition for displaying the detected at least one object is met may include: determining a distance between the at least one object and the machine; and determining that the condition is met if the distance is within a predetermined distance of the machine.

The determining whether the at least one condition for displaying the detected at least one object is met may include: determining a position of the at least one object, and determining that the condition is met if the position of the at least one object is within the predetermined area.

The determining whether the at least one condition for displaying the detected at least one object is met may further include: determining a distance between the at least one object and the machine, and determining that the condition is met if the distance is within a predetermined distance of the machine and the position of the at least one object is within the predetermined area corresponding to the position of the machine.

The displaying the graphical indicator may include displaying the graphical indicator on a portion of the machine visually obstructing the operator of the machine.

The machine may be a vehicle and the portion may be a pillar of the vehicle, the pillar may be at least one from among an A-Pillar, a B-Pillar and a C-Pillar.

The at least one condition for displaying the detected at least one object may include at least one from among a speed of the machine, a reaction time of the operator, and a number of the at least one object.

The determining whether the at least one condition for displaying the detected at least one object is may include: determining a trajectory of the at least one object or the machine, and determining that the condition is met if the determined trajectory indicates that a trajectory of the at least one object will be within a predetermined distance of a trajectory of the machine According to an aspect of another exemplary embodiment, an apparatus for warning of objects is provided. The apparatus includes at least one memory comprising computer executable instructions; and at least one processor configured to read and execute the computer executable instructions. The computer executable instructions causing the at least one processor to: detect a presence of at least one object in a predetermined area, the predetermined area being visually obstructed from an operator of a machine; determine whether at least one condition for displaying the detected at least one object is met; and in response to determining that the at least one condition is met, display a graphical indicator corresponding to the detected at least one object.

According to an aspect of another exemplary embodiment, a non-transitory computer readable medium comprising computer executable instructions executable by a processor to perform the method for warning of objects. The method includes detecting a presence of at least one object in a predetermined area, the predetermined area being visually obstructed from an operator of a machine; determining whether at least one condition for displaying the detected at least one object is met; and in response to determining that the at least one condition is met, displaying a graphical indicator corresponding to the detected at least one object on a display corresponding to the visually obstructed area.

Other objects, advantages and novel features of the exemplary embodiments will become more apparent from the following detailed description of exemplary embodiments and the accompanying drawings.

DETAILED DESCRIPTION

Figure 1:
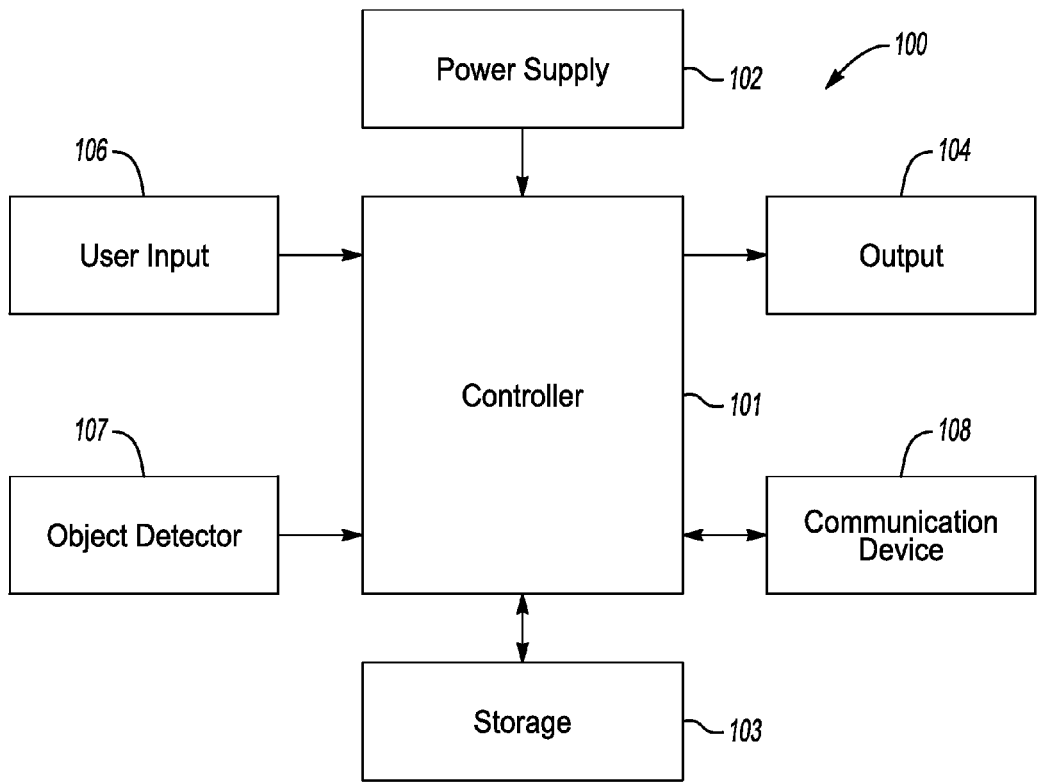
FIG. 1 shows a block diagram of an apparatus that warns of objects according to an exemplary embodiment.

An apparatus and method that warn of objects will now be described in detail with reference to FIGS. 1-4 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or combined into one or more devices. In addition, individual elements may be provided on separate devices.

Operators of devices or machines, such as vehicles, may encounter objects or obstacles during the operation of the devices or machines. For example, a driver of a vehicle may encounter static or moving objects that may cross the path of the vehicle or that may be on a trajectory to cross a path of a moving vehicle. The vehicle may be a passenger car, but it should be appreciated that any other vehicle including motorcycles, trucks, sports utility vehicles (SUVs), recreational vehicles (RVs), marine vessels, aircraft, etc., can also be used. Thus, an operator of a device or machine must detect objects or obstacles and control the device or machine to avoid the objects or obstacles. By detecting and avoiding the objects or obstacles, damages and injuries may be avoided.

In order to detect these objects or obstacles, an operator may use his/her own vision. However, in the case in which the objects or obstacles are obstructed or occluded by a component of the device or machine, an operator may not be able to visually detect these objects or obstacles. Thus, an apparatus that detects these objects or obstacles and outputs visual cues to the operator may assist an operator in avoiding these objects or obstacles that may be difficult to visually detect by the operator.

FIG. 1 shows a block diagram of an apparatus 100 for warning of objects (i.e., an apparatus for warning of visually obstructed objects) according to an exemplary embodiment. As shown in FIG. 1, the apparatus 100, according to an exemplary embodiment, includes a controller 101, a power supply 102, a storage 103, an output 104, a user input 106, an object detector 107 (i.e., an object detecting sensor), and a communication device 108. However, the apparatus 100 is not limited to the aforementioned configuration and may be configured to include additional elements and/or omit one or more of the aforementioned elements. The apparatus 100 may be implemented as part of a vehicle or as a standalone component.

The controller 101 controls the overall operation and function of the apparatus 100. The controller 101 may control one or more of a storage 103, an output 104, a user input 106, an object detector 107, and a communication device 108 of the apparatus 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the object detector 107, and the communication device 108 of the apparatus 100. The information may be sent and received via a bus or network, or may be directly read or written to/from one or more of the storage 103, the output 104, the user input 106, the object detector 107, and the communication device 108 of the apparatus 100. Examples of suitable network connections include a controller area network (CAN), a media oriented system transfer (MOST), a local interconnection network (LIN), a local area network (LAN), and other appropriate connections such as Ethernet.

The power supply 102 provides power to one or more of the controller 101, the storage 103, the output 104, the user input 106, the object detector 107, and the communication device 108 of the apparatus 100. The power supply 102 may include one or more from among a battery, an outlet, a capacitor, a solar energy cell, a generator, a wind energy device, an alternator, etc.

The storage 103 is configured for storing information and retrieving information used by the apparatus 100. The storage 103 may be controlled by the controller 101 to store and retrieve information about an object or obstacle, information on a condition for displaying an object or obstacle, and information on a graphical indicators corresponding to the objects or obstacles. The storage 103 may also include the computer instructions configured to be executed by a processor to perform the functions of the apparatus 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus 100. The output 104 may include one or more from among a speaker, a display, a transparent display, a centrally-located display, a head up display, a windshield display, a haptic feedback device, a vibration device, a tactile feedback device, a tap-feedback device, a holographic display, an instrument light, an indicator light, etc. The output 104 may also include a display located on an A-Pillar (front), a door, B-Pillar (middle), a C-Pillar (rear) of a vehicle. In addition, the output 104 may also include a transparent display located on one or more of a windshield, a rear window, side windows, and mirrors of a vehicle. The display may be a light emitting diode (LED) or organic light emitting diode (OLED) display embedded in the aforementioned pillars.

The output 104 may output a notification including one or more from among an audible notification, a light notification, and a display notification. The notification may include information regarding one or more detected obstacles or objects. The output 104 may provide an output displaying a graphical indicator corresponding to the detected object or obstacle. In one example, the graphical indicator may be a silhouette of the object. The graphical indicator may also include depth, location and trajectory cues including one or more from among a shading of a graphical indicator, a transparency of a graphical indicator, an outlining of a graphical indicator, a size of a graphical indicator, a size of a graphical indicator relative to other graphical indicators, a color of a graphical indicator, a shape of a graphical indicator, a location of a graphical indicator, a motion of a graphical indicator, an occlusion of a graphical indicator by another, and an image displayed with a graphical indicator.

The user input 106 is configured to provide information and commands to the apparatus 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to cycle through notifications or different screens of a notification.

The object detector 107 is configured to detect an object or obstacle. The object detector 107 may be one or more sensors from among a radar sensor, a microwave sensor, an ultrasonic sensor, a camera, an infrared sensor, a LIDAR, and a laser sensor. For example, the object detector may receive object information from one or more sensors and detect an object or obstacle based on the object information received from the one or more sensors. The object detector 107 provide the object information including one or more from among a position of an object, a trajectory of the object, a speed of the object, an acceleration of the object, whether the object is in a predetermined area around the machine and a distance between the object and machine or vehicle being operated by an operator. The object information may be provided to the controller 101 via a bus, storage 103 or communication device 108. The object detector 107 may be positioned in at least one from among a vehicle door, a vehicle dashboard, a vehicle mirror, a vehicle windshield, a vehicle hood, a vehicle bumper, a vehicle fender, a vehicle structural pillar (e.g., A-Pillar, B-Pillar, and/or C-Pillar), and a vehicle roof.

The communication device 108 may be used by the apparatus 100 to communicate with various types of external apparatuses according to various communication methods. The communication device 108 may be used to send/receive object information to/from the controller 101 of the apparatus 100. The communication device 108 may also be configured to transmit the notification of an object or a warning of an object that is not visible to the operator due to an obstruction or obstructing part. The notification or warning may sent by the communication device 108 to an output device or display, such as output 104.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and determines a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), Bluetooth, EVDO, CDMA, GPRS, EDGE or ZigBee.

The controller 101 of the apparatus 100 may be configured to detect a presence of at least one object in a predetermined area, the predetermined area being visually obstructed from an operator of a machine; determine whether at least one condition for displaying the detected at least one object is met; and in response to determining that the at least one condition is met, display a graphical indicator corresponding to the detected at least one object.

The controller 101 of the apparatus 100 may be configured to detect depths of the plurality of objects and control to display the graphical indicator by displaying a plurality of graphical indicators with depth cues corresponding to the detected depths of the plurality of objects.

The controller 101 of the apparatus 100 may also be configured to detect the depths, locations and trajectories of the plurality of objects and control to display a plurality of graphical indicators with depth, location and trajectory cues corresponding to the detected depths of the plurality of objects. The depth, location and trajectory cues may include one or more from among a shading of a graphical indicator, a transparency of a graphical indicator, an outlining of a graphical indicator, a size of a graphical indicator, a size of a graphical indicator relative to other graphical indicators, a color of a graphical indicator, a shape of a graphical indicator, a location of a graphical indicator, a motion of a graphical indicator, an occlusion of a graphical indicator by another, and an image displayed with a graphical indicator.

For example, when multiple graphical indicators are displayed, the size of one graphical indicator relative to the others and to contextual information (e.g., background/view through windshield/driver expectations) may be a depth cue. If a graphical indicator assumes a known shape (such as the silhouette of a cyclist or a pedestrian), then operators' mental models of the size of these familiar objects may impact their judgements. Further, if one graphical indicator overlaps another, then this may be a depth cue as to the location of an object and whether an object is in the foreground or background relative to another object. Further still, the location where a graphical indicator is displayed and the movement of a graphical indicator may be a cue for object location and trajectory. In addition, movement of the graphical indicator may be illustrated with common motion patterns (e.g., walking, cycling, stroller motion, etc.) to allow for object detection and recognition.

The controller 101 of the apparatus 100 may also be configured to determine one or more from among a distance between the object and the machine, a position of the object, and a speed of the object. The controller 101 may then determine that the condition for displaying a graphical indicator is met if the distance is within a predetermined distance of the machine, if the position of the at least one object is within the predetermined area, and/or if the speed of the object is within a predetermined speed. The controller 101 may determine the at least one condition for displaying the detected object is met based on one or more from among a speed of the machine or vehicle, a reaction time of the operator of the machine or vehicle, and a number of objects.

The controller 101 of the apparatus 100 may also control to display the graphical indicator on a portion of the machine visually obstructing the operator of the machine such as an A-Pillar, a B-Pillar and a C-Pillar of a vehicle.

Figure 2:
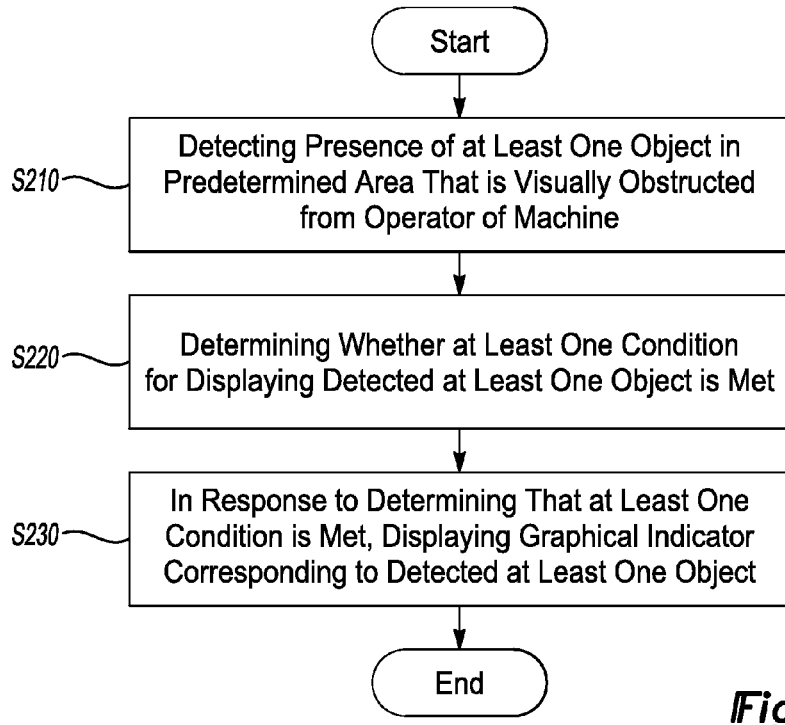
FIG. 2 shows a flowchart for a method for warning of objects according to an exemplary embodiment.

FIG. 2 shows a flowchart for a method for warning of objects according to an exemplary embodiment. The method of FIG. 2 may be performed by the apparatus 100 or may be encoded into a computer readable medium as instructions that are executable by a computer to perform the method.

Referring to FIG. 2, a presence of at least one object located in a predetermined area that is visually obstructed from an operator of a machine is detected in operation S210. It is then determined whether at least one condition for displaying the detected at least one object is met in operation S220. In operation S230, in response to determining that the at least one condition is met, graphical indicator corresponding to the detected at least one object is displayed.

Figure 3:
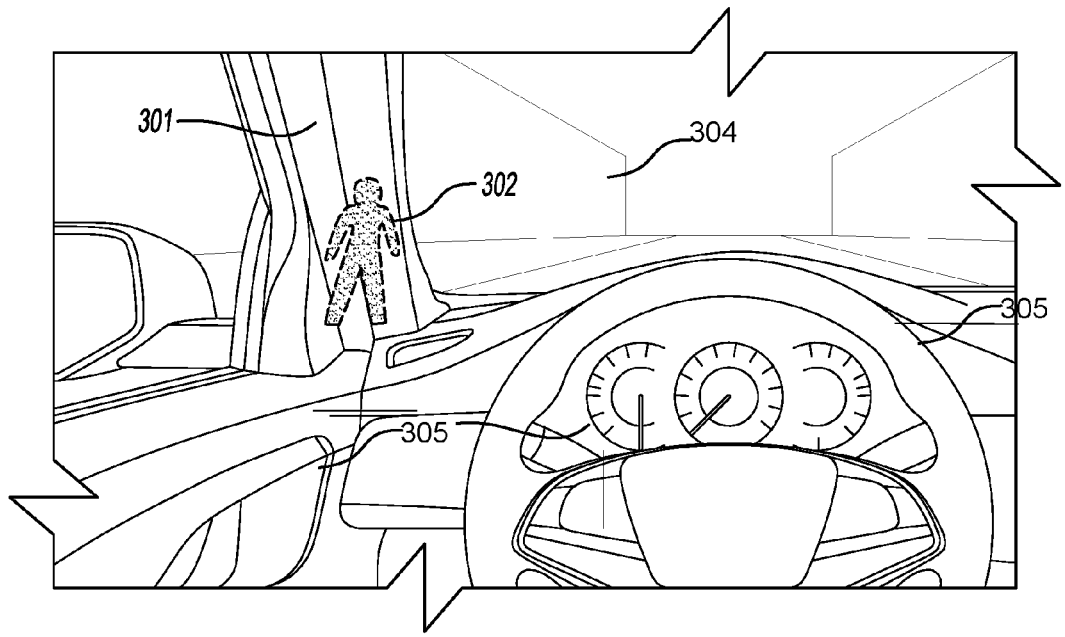
FIG. 3 shows an illustration of a warning provided to a vehicle operator according to an aspect of an exemplary embodiment.

FIG. 3 shows an illustration of a warning provided to a vehicle operator according to an aspect of an exemplary embodiment. In particular, the illustration of FIG. 3 shows a graphical indicator 302 displayed on the A-Pillar 301. The apparatus 100 may control to display the graphical indicator 302 on the A-Pillar 301.

Referring to FIG. 3, a display may be part of the A-Pillar 301 and used to display graphical indicator 302. The graphical indicator 432 may be shaded differently to indicate that a person or object corresponding to graphical indicator 302 is in a potential collision zone 304 with the machine 305. The graphical indicator 302 may be displayed with a depth, location or trajectory cues. The depth, location and trajectory cues may include one or more from among a shading of a graphical indicator, a transparency of a graphical indicator, an outlining of a graphical indicator, a size of a graphical indicator, a size of a graphical indicator relative to other graphical indicators, a color of a graphical indicator, a shape of a graphical indicator, a location of a graphical indicator, a motion of a graphical indicator, an occlusion of a graphical indicator by another, and an image displayed with a graphical indicator.

Moreover, at least one from among a position and a distance of an object or person may be determined and the at least one object or person may be displayed if one or more from among a position and a distance of an object meets a condition. For example, if the distance of the person or object is within a predetermined distance of the machine 305 and the position of the at least one object or person is within the predetermined area 304 corresponding to the position of the machine 305. Further, the at least one condition for displaying the detected at least one object or person may include one or more from among a speed of the machine, a reaction time of the operator, and a number of the at least one object.

For example, the detected at least one object or person may be displayed if the machine or vehicle is traveling at, below, or above a predetermined speed. In another example, the detected at least one object or person may be displayed when the person or object is a specific distance from the vehicle and the specific distance is less than a safe distance that is determined based on a reaction time of a machine or vehicle operator. In yet another example, the detected at least one object or person may be displayed at a point in time corresponding to the operator's or driver's reaction time to allow an operator or driver to react effectively.

The at least one condition may be that only a predetermined number of the at least one object may be displayed. For example, if there are four objects that are visually obstructed by an A-Pillar and the predetermined number of objects that may be displayed is two. The four objects may be ranked in importance from first to fourth and a graphical indicator corresponding to the top two ranked objects may be displayed. The four objects may be ranked based on one or more from among risk of collision with the machine or vehicle, speed of the object, distance from the machine or vehicle, trajectory, size, etc.

Although, the graphical indicator 302 is displayed on the A-Pillar 301. It may be displayed at least one from among an A-Pillar, a B-Pillar, a C-Pillar, or other surface of the machine or vehicle that obstructs the view of the object or person from an operator of the vehicle or machine 305.

Figure 4:
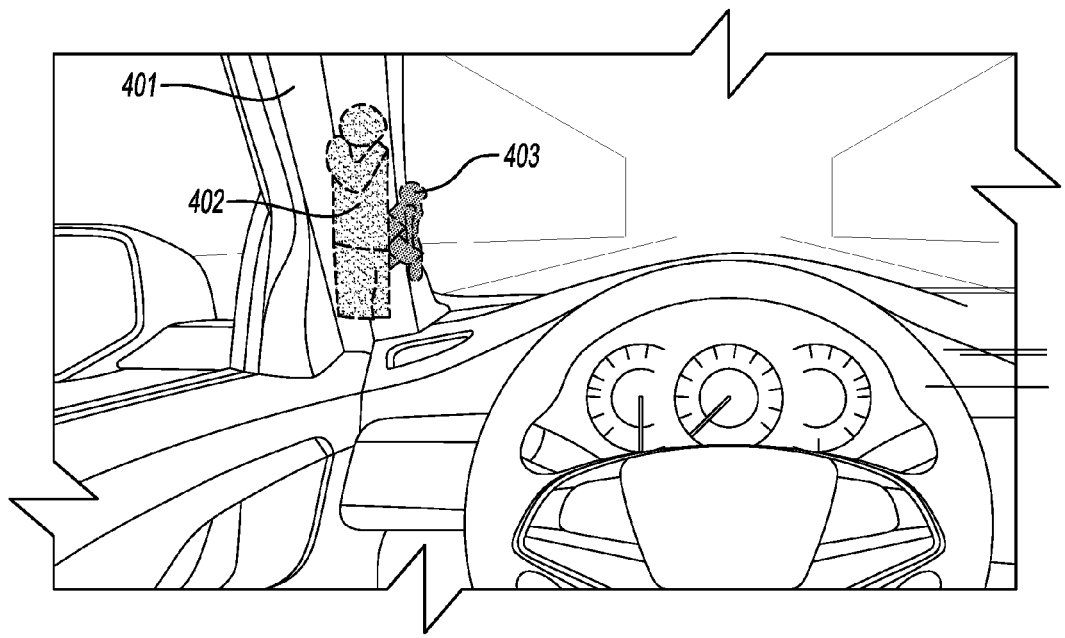
FIG. 4 shows an illustration of a warning provided to a vehicle operator according to an aspect of an exemplary embodiment.

FIG. 4 shows an illustration of a warning provided to a vehicle operator according to an aspect of an exemplary embodiment. In particular, the illustration of FIG. 4 shows a graphical indicators 402 and 403 displayed on the A-Pillar 401. The apparatus 100 may control to display graphical indicators 402 and 403 on the A-Pillar 401.

Referring to FIG. 4, a display may be part of the A-Pillar 401 and used to display graphical indicators 402 and 403. The graphical indicator 402 may be shaded differently than graphical indicator 403 to indicate that a person or object corresponding to graphical indicator 402 is closer to the vehicle or a more likely obstacle than a person or object corresponding to graphical indicator 403. In addition, graphical indicator 402 may be larger than graphical indicator 403 to indicate that a person or object corresponding to graphical indicator 402 is closer to the vehicle or a more likely obstacle than a person or object corresponding to graphical indicator 403.

Graphical indicators 402 and 403 may be displayed according to one or more depth, location and trajectory cues including one or more from among a shading of a graphical indicator, a transparency of a graphical indicator, an outlining of a graphical indicator, a size of a graphical indicator, a size of a graphical indicator relative to other graphical indicators, a color of a graphical indicator, a shape of a graphical indicator, a location of a graphical indicator, a motion of a graphical indicator, an occlusion of a graphical indicator by another, and an image displayed with a graphical indicator.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claim.

What is claimed is:

1. A method for warning of objects, the method comprising:
   detecting a presence of a plurality of objects in a predetermined area, the predetermined area being visually obstructed from an entity in a vicinity of the predetermined area;
   detecting depths, trajectories and locations of the plurality of objects;
   determining whether at least one condition for displaying the detected plurality of objects is met, the at least one condition comprising at least one from among a speed of the entity, a reaction time of the entity, and a number of the plurality of objects; and
   in response to determining that the at least one condition is met, displaying a plurality of graphical indicators corresponding to the detected depths, trajectories and locations of the plurality of objects,
   wherein the displaying the plurality of graphical indicators comprises displaying the plurality of graphical indicators with depth, location and trajectory cues including one or more from among a shading of a graphical indicator, a transparency of a graphical indicator, an outlining of a graphical indicator, a size of a graphical indicator, a size of a graphical indicator relative to other graphical indicators, a color of a graphical indicator, a shape of a graphical indicator, a location of a graphical indicator, a motion of a graphical indicator, an occlusion of a graphical indicator by another, and an image displayed with a graphical indicator.

2. The method of claim 1, wherein the determining whether the at least one condition for displaying the detected plurality of objects is met comprises:
   determining a distance between at least one object of the plurality of objects and a machine; and
   determining that the condition is met if the distance is less than a predetermined distance of the machine.

3. The method of claim 1, wherein the determining whether the at least one condition for displaying the detected plurality of objects is met comprises:
   determining a position of at least one object of the plurality of objects, and
   determining that the condition is met if the position of the at least one object is within the predetermined area.

4. The method of claim 3, wherein the determining whether the at least one condition for displaying the detected plurality of objects is met further comprises:
   determining a distance between at least one object of the plurality of objects and a machine, and
   determining that the condition is met if the distance is less than a predetermined distance from the machine and the position of the at least one object is within a predetermined area corresponding to the position of the machine.

5. The method of claim 1, wherein the displaying the plurality of graphical indicators comprises displaying the plurality of graphical indicators on a portion of a machine that visually obstructs the predetermined area.

6. The method of claim 5, wherein the machine comprises a vehicle and the portion comprises a pillar of the vehicle, and
   wherein the pillar comprises at least one from among an A-Pillar, a B-Pillar and a C-Pillar.

7. The method of claim 1, wherein the determining whether the at least one condition for displaying the detected plurality of objects is met comprises:
   determining a trajectory of at least one object of the plurality of objects or a machine, and
   determining that the condition is met if the determined trajectory indicates that a trajectory of the at least one object will be within a predetermined distance of a trajectory of the machine.

8. An apparatus for warning of objects, the apparatus comprising:
   at least one memory comprising computer executable instructions; and
   at least one processor configured to read and execute the computer executable instructions, the computer executable instructions causing the at least one processor to:
   detect a presence of a plurality of objects in a predetermined area, the predetermined area being visually obstructed from an entity in a vicinity of the predetermined area;
   detect depths, trajectories and locations of the plurality of objects;
   determine whether at least one condition for displaying the detected plurality of objects is met, the at least one condition comprising at least one from among a speed of the entity, a reaction time of the entity, and a number of the plurality of objects; and
   in response to determining that the at least one condition is met, display a plurality of graphical indicators corresponding to the detected depths, trajectories and locations of the plurality of objects,
   wherein the displaying the plurality of graphical indicators comprises displaying the plurality of graphical indicators with depth, location and trajectory cues including one or more from among a shading of a graphical indicator, a transparency of a graphical indicator, an outlining of a graphical indicator, a size of a graphical indicator, a size of a graphical indicator relative to other graphical indicators, a color of a graphical indicator, a shape of a graphical indicator, a location of a graphical indicator, a motion of a graphical indicator, an occlusion of a graphical indicator by another, and an image displayed with a graphical indicator.

9. The apparatus of claim 8, wherein the computer executable instructions cause the at least one processor to determine whether the at least one condition for displaying the detected plurality of objects is met by:
   determining a distance between at least one object of the plurality of objects and a machine; and
   determining that the condition is met if the distance is less than a predetermined distance of the machine.

10. The apparatus of claim 8, wherein the computer executable instructions further cause the at least one processor to determine whether the at least one condition for displaying the detected plurality of objects is met by:
    determining a position of at least one object of the plurality of objects, and
    determining that the condition is met if the position of the at least one object is within the predetermined area.

11. The apparatus of claim 10, wherein the computer executable instructions further cause the at least one processor to determine whether the at least one condition for displaying the detected plurality of objects is met by:
   determining a distance between at least one object of the plurality of objects and a machine, and
   determining that the condition is met if the distance is less than a predetermined distance from the machine and the position of the at least one object is within a predetermined area corresponding to the position of the machine.

12. The apparatus of claim 8, wherein the computer executable instructions further cause the at least one processor to display the plurality of graphical indicators by displaying the plurality of graphical indicators on a portion of the machine that visually obstructs the predetermined area.

13. The apparatus of claim 12, wherein the machine comprises a vehicle and the portion comprises a pillar of the vehicle, and
   wherein the pillar comprises at least one from among an A-Pillar, a B-Pillar and a C-Pillar.

14. A non-transitory computer readable medium comprising computer executable instructions executable by a processor to perform a method for warning of objects, the method comprising:
   detecting a presence of a plurality of objects in a predetermined area, the predetermined area being visually obstructed from an entity in a vicinity of the predetermined area;
   detecting depths, trajectories and locations of the plurality of objects;
   determining whether at least one condition for displaying the detected plurality of objects is met, the at least one condition comprising at least one from among a speed of the entity, a reaction time of the entity, and a number of the plurality of objects; and
   in response to determining that the at least one condition is met, displaying a plurality of graphical indicators corresponding to the detected depths, trajectories and locations of the plurality of objects on a display corresponding to the visually obstructed area,
   wherein the displaying the plurality of graphical indicators comprises displaying the plurality of graphical indicators with depth, location and trajectory cues including one or more from among a shading of a graphical indicator, a transparency of a graphical indicator, an outlining of a graphical indicator, a size of a graphical indicator, a size of a graphical indicator relative to other graphical indicators, a color of a graphical indicator, a shape of a graphical indicator, a location of a graphical indicator, a motion of a graphical indicator, an occlusion of a graphical indicator by another, and an image displayed with a graphical indicator.

\* \* \* \* \*